May 26, 1970  J. DE LA CIERVA  3,514,192
ACHROMATIC VARIABLE-ANGLE FLUID PRISM
Filed April 11, 1967  2 Sheets-Sheet 1
FIG.1
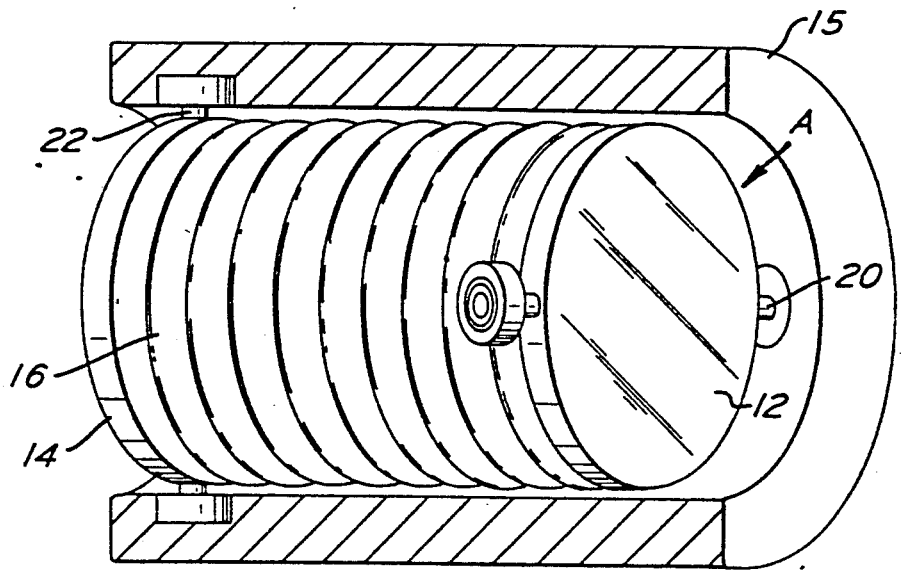
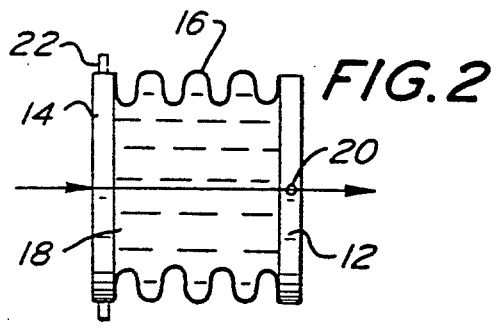
FIG.2
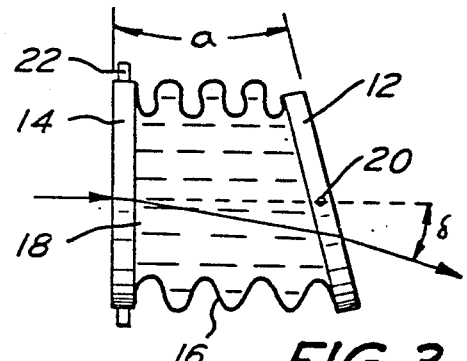
FIG.3
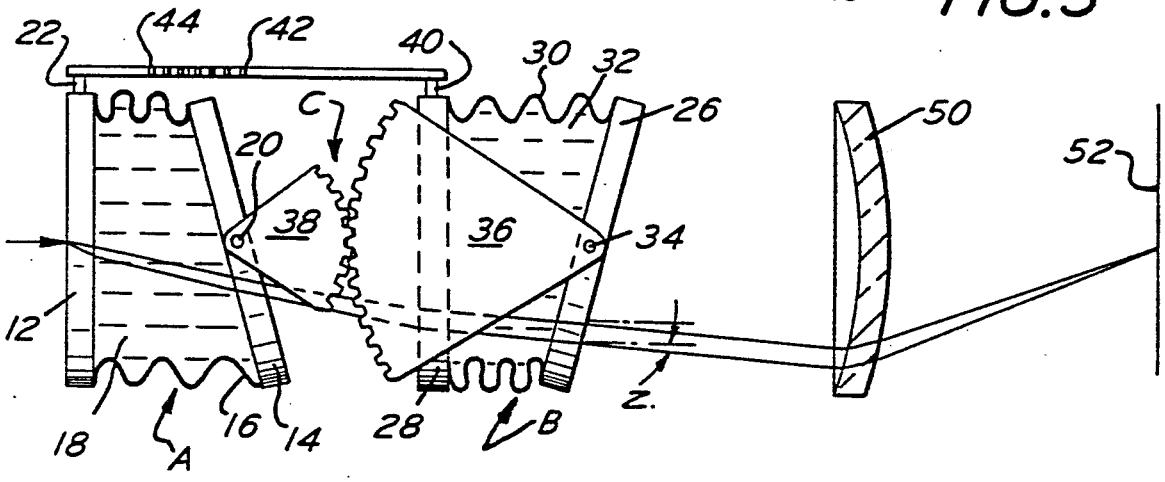
FIG.4
INVENTOR
JUAN De La CIERVA
BY Belker & Kimmelman
ATTORNEYS.

May 26, 1970   J. DE LA CIERVA   3,514,192
ACHROMATIC VARIABLE-ANGLE FLUID PRISM
Filed April 11, 1967   2 Sheets-Sheet 2

INVENTOR
JUAN De La CIERVA
BY
Belher & Kummelman
ATTORNEYS.

United States Patent Office 3,514,192
Patented May 26, 1970

3,514,192
ACHROMATIC VARIABLE-ANGLE FLUID PRISM
Juan de la Cierva, Oreland, Pa., assignor to Dynasciences Corporation, Blue Bell, Pa., a corporation of Pennsylvania
Filed Apr. 11, 1967, Ser. No. 630,090
Int. Cl. G02b 5/06
U.S. Cl. 350—286
6 Claims

ABSTRACT OF THE DISCLOSURE

This invention comprises a first variable-angle or changeable geometry fluid prism for deviating a beam of multi-chromatic light in compensation of angular motion of an optical system with respect to its axis of collimation upon an object and a second variable-angle fluid prism having a liquid encapsulated of a different index of refraction from the first prism. The second prism element is coupled to the first element to compensate for chromatic dispersion of the various wave length individual rays which have been bent into divergence in passing through the first element.

BRIEF SUMMARY OF THE INVENTION

This invention relates to transparent variable angle fluid prisms for providing image motion compensation. More particularly, it relates to color correction optical system for minimizing chromatic dispersion where large deviations, high resolutions and broad spectrum or wide band beams are to be handled by such hydro-prismatic, variable angle, motion compensating elements. The present device is also concerned with the combination of two or more variable-angle prismatic systems wherein one of such hydro-prismatic elements is utilized for low frequency, low accuracy and large angle scanning motions and the other of the variable angle elements provides fine vernier control of high frequency, high accuracy small motions.

In my prior U.S. Pat. No. 3,212,420, there is shown a variable geometry transparent fluid prism which corrects for image motion by deflecting or deviating an electromagnetic beam of light or energy from the object or source. The correcting element generally comprises a pair of flat transparent glass plates coupled by a peripheral flexible bellows and encapsulating a liquid-filled volume enclosed therebetween. Where the two plates are maintained in parallel disposition with respect to each other, a light beam passing therethrough is transmitted without suffering any deviation in light path. However, if one of the plates is disposed at an angle with respect to the other, a beam of light going through the liquid element experiences a deviation, Z, whose magnitude depends upon the prism angle, $a$, and the index of refraction, $N$, of the liquid element.

The deviation angle induced in a light beam can be derived and is computed as follows:

$$Z = i - a + \sin^{-1}\left\{N \cdot \sin\left[a - \sin^{-1}\left(\frac{\sin i}{N}\right)\right]\right\}$$

Thus, the deviation angle, Z, is a function of the index of refraction, N. However, the value of N is not constant for all light colors (wave lengths). Where the light beam to be deflected is monochromatic, for example, the handling of a laser light beam, all that need be known is the value of N for the particular monochromatic ray. Also, where the deviation angle is small, less than 0.5°, for example, even a multichromatic beam, a ray of white light, will suffer minimal chromatic dispersion. But, where large deviational corrections are required greater than 18°, for example, and the chromatic dispersion of the light beam is undesirable, as where the optical sensor can detect the color ray separation, then means must be employed to obviate the chromatic dispersion.

The chromatic dispersion characteristics of a transparent medium is measured by its $\nu$-value (nu-value). The $\nu$-value is determined by $$\nu = \frac{N_d - 1}{N_f - N_c}$$

where $N_d$ is the index of refraction at $d$-line in the helium spectrum (wave length=5875.6 Angstrom),
$N_f$ is index of refraction at the $f$-line in the mercury spectrum (wave length=4861.3 Angstrom), and
$N_c$ is index of refraction at the $c$-line in the mercury spectrum (wave length $-6562.8$ Angstrom)

It is therefore an object of this invention to provide an acromatic image motion compensating system for optical apparatus.

Another object of this invention is to provide a variable-angle fluid prism for correcting chromatic dispersion produced by a primary variable-angle fluid prism in compensating for deflections, resulting from image motion.

Yet another object of this invention is to provide an achromatic variable-angle fluid prismatic optical device for television, aerial camera reconnaissance, and ocular image motion compensation.

A further object of this invention is to provide an optical scanning device in which large angle scanning is accommodated by a low frequency, low accuracy variable angle prism and small angle, high frequency motion is controlled by a second variable angle element.

A still further object of this invention is to provide an achromatic and optical motion compensation device for minimizing chromatic dispersion where large deviations, high resolutions and wide band beams are to be accommodated.

Other objects of this invention are to provide an improved device of the character described which is easily and economically produced which is sturdy in construction, and both highly efficient and effective in operation.

With the above and related objects in view, this invention consists of the details of construction and combination of parts as will be more fully understood from the following detailed description when read in conjunction with the accompanying drawing in which:

DESCRIPTION OF THE FIGURES

FIG. 1 is a perspective view of a variable geometry fluid prism embodied in this invention.

FIG. 2 is a sectional view taken longitudinally through the fluid prism.

FIG. 3 is a sectional view similar to FIG. 2 but with the fluid prism oriented at a wedge angle.

FIG. 4 is a sectional view combining an achromatic variable angle prism with a primary variable geometry fluid prism.

DETAILED DESCRIPTION

Figure 5:
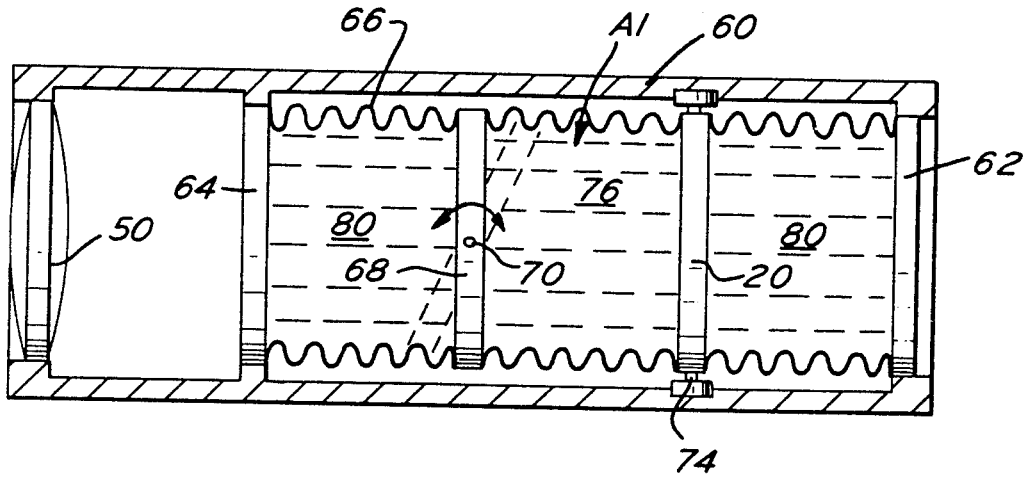
FIG. 5 is a sectional view of a modification of the achromatic variable-geometry fluid prism shown in FIG. 4.

Referring now in greater detail to the drawings in which similar reference characters refer to similar parts, I show a first or primary variable-angle prismatic wedge, generally designated as A, which corrects for angular image motion or deviation with respect to an axis of collimation, and a secondary or anachromatic variable geometry prismatic wedge, generally designated as B.

The fluid wedge A is substantially identical to that shown in my prior Pat. No. 3,212,420 and includes a front transparent disk or glass plate 12, a rear glass plate 14, and a liquid tight flexible bellows 16 peripherally supported about the front and rear plates and encapsulating a fluid-filled volume 18 therebetween. The axis of rotation 20 of the front glass 12 is horizontal and the pivotal axis 22 of the rear glass is vertical so that the axes are mutually perpendicular. Therefore, rotating the front glass 12 about its axis 20 produces an optical deviation in a vertical or elevation plane while rotating the rear glass 14 about its axis 22 produces an optical deflection in a horizontal or azimuth plane. By moving the two disks simultaneously about their respective axes, the resultant optical deviation angle can be configured to any value within a specified conically oriented angle.

No specific constructional system, bearings, housings, frames, drive units or supports have been indicated or designated with respect to the manner of mounting or coupling the axes of the shafts 20 and 22 or holding the prismatic unit within its associated system. An example of such a constructional system is shown in prior Pat. No. 3,212,420. Since any number of equivalent supports and structures can be utilized to demonstrate external linkages and housings, it is believed that the inclusion of these external mountings here would not implement understanding but would only detract from the lucidity. Figures will be kept simple and generally indicate merely a basic cooperation of elements.

Referring now to FIG. 4, the achromatic or color correcting element B is coupled to the primary or image compensating element A by angular motion transmission means C, such as a gear train. The element B includes a forward disk 26, a rearward disk 28, a bellows 30 and a fluid element 32. A horizontal trunnion 34 mounting the rearward disk 28 about a horizontal axis has a gear 36 affixed thereto and in intermeshing relationship with a gear 38 affixed to the shaft 20 of the rear plate 14 in element A. Of course, the gear 36–38 are merely representative of a gear train transmission system. Similarly, vertical shaft 40 on forward disk 28 has a gear 42 which intermeshes with gear 44 mounted on shaft 22 of element A.

It is to be observed that the gear system C enables the corresponding geared faces 12–28 and 14–26 to cant in opposite directions, and at different amplitudes, by virtue of the gear ratio. The wedge angle of the primary element A is always opposite to the prism angle of the achromatic or correcting element B.

Referring still to FIG. 4, a ray of white light striking the front face 12 of the primary element A and passing therethrough experiences an angular deviation which is related to the wedge angle of the fluid 18. At the same time, there is produced a chromatic dispersion which is represented as an angular divergence between the red and blue rays emerging from the primary element A. This divergence is made as small as possible for the required deviation angle by using a liquid 18 in the primary element A having as high a nu-value as possible.

When the divergent beams (red and blue) pass through the corrective element, they experience a deviation in the opposite direction. Since the ratio of the gear train C produces a smaller wedge, the magnitude of the deviation in the opposite direction, is reduced. However, the liquid 32 in the correcting element B has a high dispersive power (very low nu-value), and as a result, the divergence between the red and blue rays is cancelled. The red and blue rays emerging from the color connecting element B are accordingly parallel. Thus, when the parallel red and blue rays pass through lens 50, which is, of course, achromatic itself, they will be imaged at a single point on the focal plane or image plane.

Referring now to FIG. 5, I show a modification D of the achromatic variable-angle fluid element B in which the gear transmission linkages C of the latter are eliminated. A housing 60 of generally cylindrical configuration includes a pair of transparent fixed end disks or face plates 62 and 64 mounted within suitable liquid tight cells. A bellows 66 which may include a plurality of sections extends from the periphery of the end disks 62 and 64. A first tilting glass plate 68 which is pivotable about a horizontal axis on trunnions 70 is spaced from the disk 64. A second tilting plate 72 which is pivotable about a vertical axis on trunnions 74 is spaced intermediate plate 70 and disk 62. The two internal face plates 68 and 72 which are movable about mutually perpendicular axes include therebetween and the bellows 66 a liquid 76 of a particular index of refraction to define a deviational motion variable angle element A1.

The volume between disk 64 and plate 68 and the volume between disk 62 and plate 72 are filled with a liquid 80 of a second index of refraction. It can be shown that for a light beam of one particular color, the total deviational angle, Z, impressed by the element D for small angles is:

$$Z_, = a_, (N_{80} - N_{76})$$

where $A_, =$ angle of plate 68 or 72 from parallel with plate 62 and 64
$N_{80} =$ index of refraction of liquid 80
$N_{76} =$ index of refraction of liquid 76

If the index of refraction curves of both liquids are parallel, the value of $(N_{80} - N_{76})$ will be constant for a broad color band. Accordingly, all color frequencies within the band would receive identical deviations for a given motion plate angle A. An example of liquids having parallel index-to-color curves are olive oil (high index) and hexylene (low index).

It is apparent that an advantage of the design of the modification D lies in its ability to achieve achromatic deviation by use of only a single plate in each plane without the need for gear couplings or the like. However, the modification D also has the disadvantage in that the ratio between $A_,$ and Z, is quite large for presently available liquids, so as to require comparatively large motions of plates 68 and/or 72 to achieve relatively small angular motion deviations.

Figure 6:
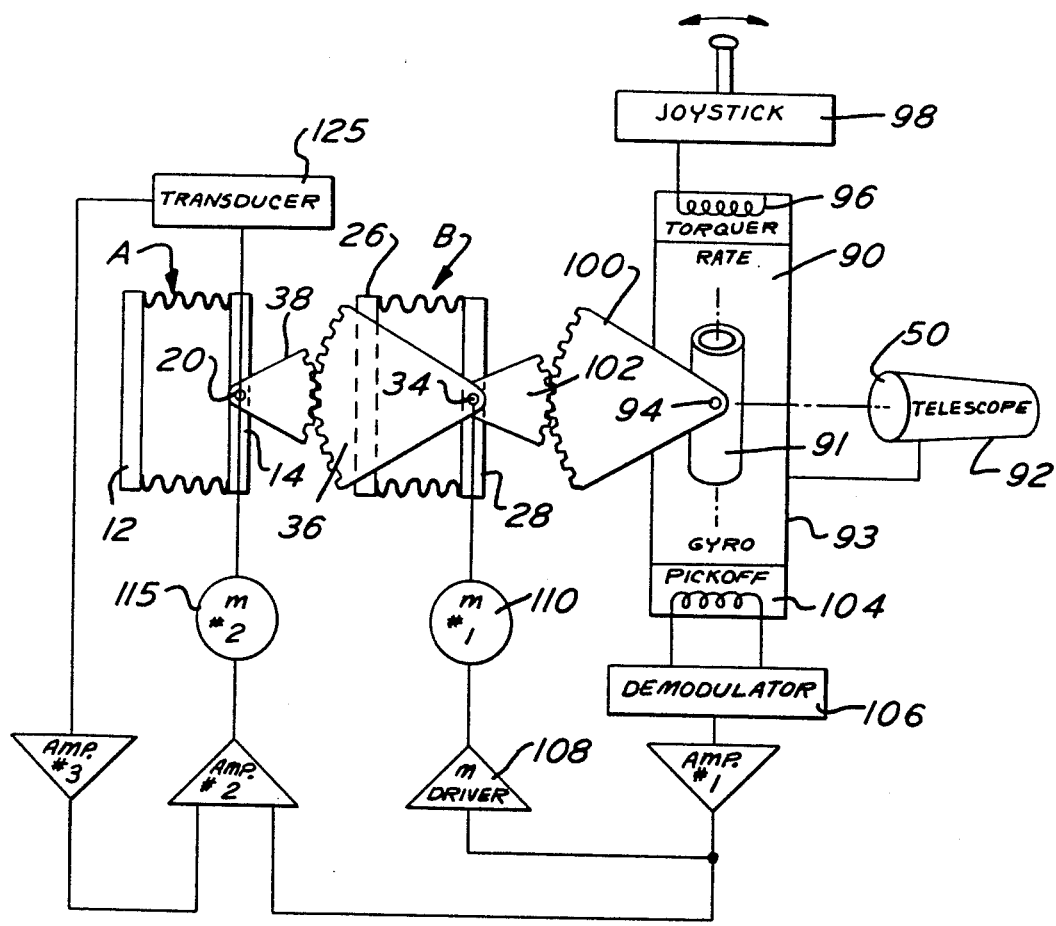
FIG. 6 is a schematic representation in block diagram form of another embodiment of the invention.

Referring now to FIG. 6, there is shown an application of the achromatic system in which it is desired to provide large angle scanning motion by means of the achromatic element B and achieve fine or vernier control of deviation with the primary element A. In this embodiment, which is represented in block diagram form, a rate integrating gyroscope 90 is used as an inertial sensor and has its mass 91 spinning about a vertical axis in the plane of the paper in a conventional manner. The spin reference axis is thus vertical. A telescope 92 or camera is mounted upon the housing 93 of the rate gyro 90 whose precessional axis 94 is perpendicular to the plane of the paper and corresponds to the pitch axis of a vehicle or aircraft. Only the pitch system of scanning is shown, and it is to be noted that the scanning in a roll direction will be identical by using a second rate gyro system.

A torquer 96 is coupled to a joystick 98 for urging the housing 93 clockwise or counterclockwise about the axis 94. Gear 100 is coupled to the shaft 94 and intermeshes with gear 102 affixed to trunnion 34 on which rear disk 28 of a chromatic element B is rotatable. Gear 36 affixed to trunnion 34 intermeshes with gear 38 mounted on shaft 20 of rear plate 14 in primary element A, as before and as shown previously in FIG. 4.

The pick-off 104 is fed into a demodulator 106 so as to feed a D.C. signal into amplifier No. 1 which is proportional to the angular motion of shaft 94. Achromatic system motor 110 is coupled to motor driver 108 and to the output of amplifier No. 1. Hence, the mechanical loop formed by the gyroscope 90, the demodulator 106, the amplifier No. 1, the motor driver 108 and the achromatic system motor 110 maintains the line of sight aligned with the gyroscope input axis (horizontal in the plane of the paper and normal to the axis of spin) with a low accuracy-low frequency performance.

The alignment error from the first loop is fed into amplifier No. 2 and thence into primary motor 115. Transducer 125 at top of element determines where the position of shaft 20 is with respect to where it should be and feeds back the error through amplifier No. 3 and into the summing point of amplifier No. 2. Therefore, the error of the achromatic loop is optically cancelled by the vernier loop of the primary element A. Since the angular range of operation of the vernier loop is only the "error" of the achromatic loop (typically only two to five degrees), its results in very small system chromaticity. It also permits the design of a high precision, high frequency vernier loop.

Aiming or scanning of the system is accomplished by the electrical system generated by the joystick 98. Also in the event that angular motion is imparted to the telescope 92 by pitching of the vehicle, the deviational correction of the optical line of sight will be made about the joystick position.

What is claimed is:
1. An achromatic stabilizing and scanning device for an optical system comprising:
   a first variable-angle transparent fluid element including a pair of transparent disks pivotally supported with respect to each other along mutually perpendicular axes and encapsulating a liquid of a first index of refraction interposed transverse to the axis of collimation of the optical system for deviating a beam of multichromatic light in compensation of angular motion of the optical system with respect to an object,
   a second variable-angle transparent fluid element including a pair of transparent plates pivotally supported with respect to each along mutually perpendicular axes and encapsulating a liquid of a second index of refraction interposed transverse to the axis of collimation of the optical system and adjacent said variable-angle fluid element, and
   means for coupling said second variable-angle fluid element with said first variable-angle fluid element to compensate for chromatic dispersion of the multichromatic light beam produced by said first variable-angle fluid element, said means for coupling being disposed along mutually perpendicular axes substantially normal to the axis of collimation and being so constructed and arranged that as said first variable-angle fluid element forms a wedge angle of a predetermined degree and in a predetermined angular directional sense in compensation of the angular motion of the optical system said second variable-angle fluid element is urged into a second wedge angle of a lesser degree and in an opposite angular directional sense from the first wedge angle to restore angular dispersion between monochromatic light rays of different wave lenghts back into parallelism.

2. The invention of claim 1 wherein the chromatic dispersion characteristics of said first liquid has a high nu-value.

3. The invention of claim 1 wherein one of the plates of the second element is coupled to one of the disks of said first element rotatable along a parallel axis therewith, and the other of the plates of the second element is coupled to the other of the disks of said first element.

4. The invention of claim 3 wherein the coupling of the respective plates and disks comprises intermeshing gears.

5. The invention of claim 3 including at least one rate gyro mechanically coupled with the optical system means for rotating said gyro about a first axis shaft therein, means for mechanically coupling said shaft with one of said plates, a motor coupled to the shaft of said plate, means to pick off and amplify the angular position of said rate gyro about said first axis and defining a mechanical loop with said gyro and said motor.

6. The invention of claim 5 including a second motor coupled to the shaft of the disk coupled to said first mentioned plate, means to amplify and deliver a signal proportional to the output of said first amplifier means into said second motor, transducer means for determining the position of said disk shaft, and means for feeding back the error of said disk shaft to said second amplifier means.

References Cited

UNITED STATES PATENTS

| 2,504,039 | 4/1950 | O'Leary | 350—286 |
| 3,012,463 | 12/1961 | Krivit | 350—48 |
| 3,212,420 | 10/1965 | De La Cierva | 350—285 |
| 3,438,700 | 4/1969 | Gillard | 350—285 |

FOREIGN PATENTS 184,476   9/1966   Russia.

DAVID SCHONBERG, Primary Examiner

A. M. OSTRAGER, Assistant Examiner